United States Patent [19]
Arts

[11] Patent Number: 4,774,403
[45] Date of Patent: Sep. 27, 1988

[54] TRIANGULATION-TYPE POSITION MEASURING DEVICE

[75] Inventor: Michael T. Arts, Deerfield, Fla.

[73] Assignee: Harvey Industries, Inc., Little Rock, Ark.

[21] Appl. No.: 32,399

[22] Filed: Mar. 30, 1987

[51] Int. Cl.⁴ .............................................. G01J 1/32
[52] U.S. Cl. .................................... 250/205; 250/561; 356/4
[58] Field of Search ...................... 356/1, 4, 376, 381; 250/560, 561, 205

[56] References Cited

U.S. PATENT DOCUMENTS

| | | | |
|---|---|---|---|
| 4,274,735 | 6/1981 | Tamura et al. | 356/1 |
| 4,527,891 | 7/1985 | Lambeth | 356/1 |
| 4,567,347 | 1/1986 | Ito et al. | 356/376 |

Primary Examiner—Edward P. Westin
Assistant Examiner—Khaled Shami
Attorney, Agent, or Firm—Walker & McKenzie

[57] ABSTRACT

A position measuring device using a triangulation scheme for position sensing. A laser diode projects a spot upon a target surface. The image of the spot is focused on a Charge Coupled Device linear image sensor. The image of the sensor is indicative of the distance from the device to the target surface.

8 Claims, 2 Drawing Sheets

TRIANGULATION-TYPE POSITION MEASURING DEVICE

BACKGROUND OF THE INVENTION

1. Field of the Invention:

The present invention relates, in general, to optical devices that use a triangulation scheme for position sensing or measuring.

2. Description of the Related Art:

Devices which use triangulation schemes for position sensing or measuring are common. A preliminary patentability search conducted in class 356, subclasses 376 and 381 disclosed the following patents: Keuffel et al, U.S. Pat. No. 3,013,464; Milnes, U.S. Pat. No. 3,187,185; Denton, U.S. Pat. No. 3,806,253; Rosenfeld et al, U.S. Pat. No. 3,885,875; McFarlane, U.S. Pat. No. 4,053,234; Borgese, U.S. Pat. No. 4,063,820; Bodlaj, U.S. Pat. No. 4,068,955; Strandberg, U.S. Pat. No. 4,097,159; Hammar, U.S. Pat. No. 4,192,613; Bodlaj, U.S. Pat. No. 4,212,534; Steele, U.S. Pat. No. 4,349,274; and Truax, U.S. Pat. No. 4,502,785. None of the above patents disclose or suggest the present invention.

SUMMARY OF THE INVENTION

The present invention is directed toward providing a position measuring device having several significant improvements which improve accuracy and minimize any calibration or adjustment which might be required by the end user.

The position measuring device of the present invention comprises, in general, light means for directing an initial light beam against a target surface and for causing a spot of diffuse reflected light to be projected from the target surface; linear image sensor means mounted relative to the light means so that the reflected light from the target will be directed thereagainst for producing a signal in response to the specific location the reflected light strikes the sensor means, the specific location the reflected light strikes the sensor means depending on the specific angle between the spot of diffuse reflected light and the plane of the image sensor means; and analyzing means for receiving the signal from the sensor means and for producing output data concerning the position of the target surface, the analyzing means including peak detection means for determining the specific area of the sensing means that is most intensely illuminated by the reflected light.

The prefered embodiment of the present invention thus basically consists of a laser diode which projects a spot upon a target surface with the image of this spot focused on a charge coupled device (CCD) linear image sensor. The position of the image on the sensor is indicative of the distance from the device to the target surface.

While devices which use this triangulation scheme for position sensing are common, the present invention has several significant improvements which enhance accuracy and minimize any calibrations or adjustments which might be required by the end user and which include:

(1) Peak detection of image: The standard technique for determining the center of a laser image on the image sensor is to consider the center as halfway between the light and dark edges of the image. These edges are determined by circuitry which detects a rapid change in the level of the CCD's video output, or by comparing the video output to a fixed reference voltage. Both techniques result in substantial measurement error if the target surface is inclined relative to the laser beam or if the reflectivity of the target surface is not uniform. The present invention uses a peak detection circuit which indicates the location of the element in the image array that is most intensely illuminated. This technique, used in conjunction with automatic modulation of the laser drive power, results in high repeatability of the measurement regardless of the surface features of the target surface.

(2) Automatic compensation of laser drive power: The accuracy of a linear array measuring device is enhanced if the individual array elements, called photosites, are not saturated. Since the amount of charge that a photosite acquires is dependent on temperature, exposure time, and the reflectivity of the target surface, some method must be used to dynamically control the charge rate. Typically this is done by varying the array clock frequency and hence the exposure time. The minimum frequency, however, is limited by the dark current (the charge acquired when the photosite is not illuminated); the maximum frequency is limited by the response time of the array. Modulating the laser drive power allows a large dynamic range to compensate for differences in target surface reflectivity and the temperature of the array. It also allows a fixed array clock frequency; this is desirable if the target surface is moving and position must be measured at constant intervals.

(3) Integrated linearization circuit: The output from the image sensor array is inherently non-linear, even though the photosites are equidistant from each other, because of distortion caused by the lens. Non-linearity also results if the image sensor is inclined relative to the lens (to improve the focus of the laser image on the image sensor). These factors may be compensated for by the use of linearizing erasable programmable read only memory circuits (EPROMs) which outputs the correct position for any given input from the image sensor circuit. An EPROM look-up table may be generated by an automated fixture which records the actual distance to the target surface (as measured by some external device) for every increment output from the image sensor; the EPROM is then programmed with this data.

DESCRIPTION OF THE PREFERRED EMBODIMENT

Figure 1:
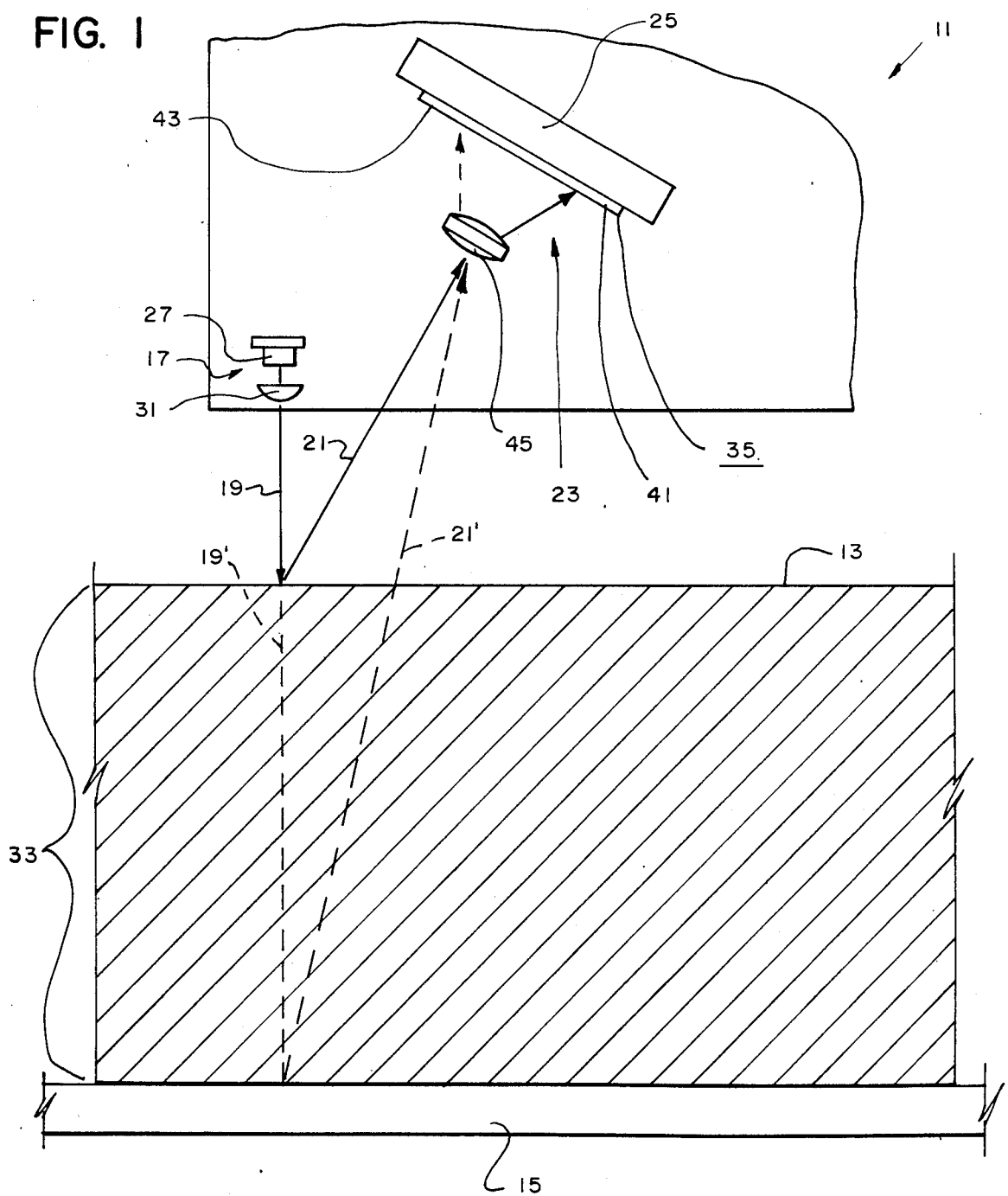
FIG. 1 is a diagrammatic view showing the position measuring device of the present invention in use.

The preferred embodiment of the position measuring device is shown diagrammatically in the drawings and identified by the numeral 11. The device 11 is used to determine the position of a target surface 13, such as the face surface of a board being moved by a conveyor 15 (see FIG. 1). The device 11 may be used in pairs with a first position measuring device located above the board and with a second position measuring device located below the board and opposed to the first position measuring device to provide a caliper-like measurement to accurately profile both sides of the board, etc., as will now be apparent to those skilled in the art.

The device 11 includes, in general, light means 17 for directing an initial light beam 19 against the target surface 13 and for causing a spot of diffuse reflected light 21 to be projected from the target surface 13; linear image sensor means 23 mounted relative to the light means 17 so that the reflected light will be directed thereagainst; and analyzing means 25 for receiving a signal from the sensor means 23 and for producing output data concerning the position of the target surface 13.

The light means 17 preferably includes a laser diode 27 for producing the initial beam 19. The laser diode 27 is of typical construction and operation well known to those skilled in the art. A typical laser drive modulator means 29 is preferably associated with the laser diode 27 for modulating the laser diode 27 to provide the light means 17 with a large dynamic range to compensate for differences in target surface reflectivity and array temperature, etc., for reasons and in a manner as will now be apparent to those skilled in the art. The light means 17 also preferably includes a lens member 31 for focusing the initial light beam 19 onto the target surface 13. Preferably, the lens member 31 will focus the initial light beam 19 over a desired sense area or target range 33 having a depth of, for example, 6 inches. The initial light beam and reflected light are shown diagrammatically in solid lines in FIG. 1 in one extreme position of the sense area and identified by the numerals 19, 21 respectively. The initial light beam and reflected light are shown diagrammatically in broken lines in FIG. 1 in the other extreme position of the sense area and identified by the numerals 19', 21' respectively.

The linear image sensor means 23 produces a signal in response to the specific location of the spot of diffuse reflected light 21. The specific location the reflected light 21 strikes the sensor means 23 depends on the specific angle between the spot of diffuse reflected light 21 and the plane of the image sensor means 23. The sensor means 23 includes an image array means 35 having a plurality of photosites with the reflected light 21 striking one or more photosites. The image array means 35 preferably consists of a typical charge coupled device (CCD) of well-known operation and construction to those skilled in the art. The image array means 35 preferably has a planar face surface with a first end 41 and a second end 43 arranged so that the reflected light 21 will be focused adjacent the first end 41 when the target surface 13 is located at one extreme position of the target range 33 and will be focused adjacent the second end 43 when the target surface 13 is located at the other extreme position of the target range 33. The sensor means 23 preferably includes a lens member 45 for focusing the reflected light 21 onto the image array means 35. The lens member 45 preferably causes the reflected light 21 to be slightly out of sharp focus when it contacts the image array means 35 in any manner now apparent to those skilled in the art.

Figure 2:
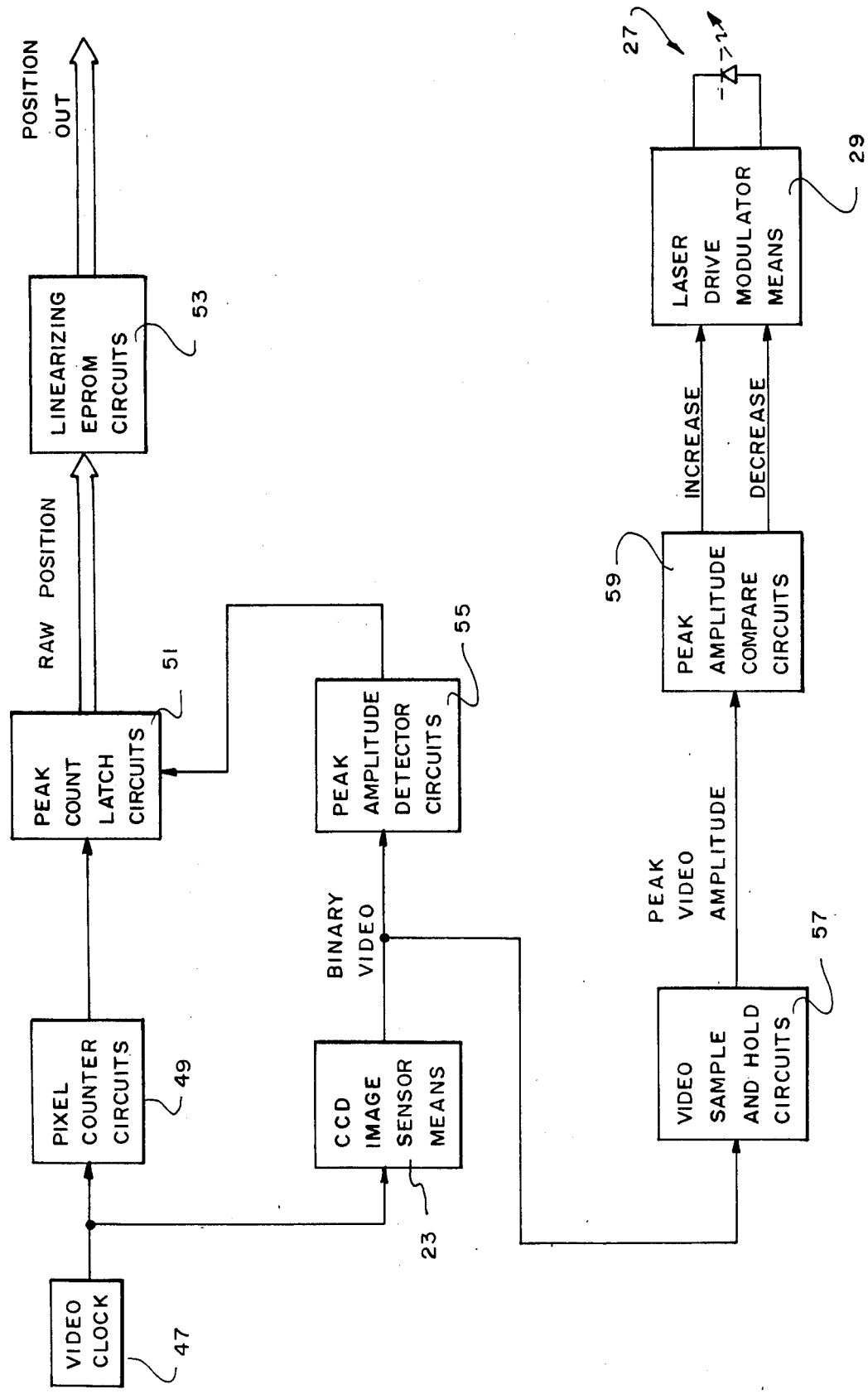
FIG. 2 is a schematic block diagram of the various components of the position measuring device of the present invention.

A functional, schematic block diagram of the device 11 is shown in FIG. 2. With respect to the embodiment disclosed in FIG. 2, a video clock 47 generates a timed pulse which passes to pixel counter circuits 49 and to the CCD image sensor means 23. Output from the CCD image sensor means 23 passes to video sample and hold circuits 57 and to peak amplitude detector circuits 55. Output from the video sample and hold circuits 57 (peak video amplitude) pass to peak amplitude compare circuits 59. Output from the peak amplitude compare circuits 59 (increase or decrease) pass to the laser drive modulator means 29 which in turn controls the laser diode 27. Output from the pixel counter circuits 49 and peak amplitude detector circuits 55 pass to peak count latch circuits 51. Output from the peak count latch circuits 51 (raw position) pass to linearizing EPROM circuits 53. Output from the linearizing EPROM circuits 53 (position out) may pass to any typical display device, or the like, as will now be apparent to those skilled in the art. While nothing in the prior art suggests the specific combination shown in FIG. 2, anyone skilled in the art could make and use the device 11 based on this specification, including the drawings.

As thus constructed and used, the present invention provides a positioning measuring device having a high degree of repeatability (plus or minus 1/32 inch), having a small sense area (1/10 inch square) that can take up to 500 measurements per second that needs little or no calibration after initial calibration at installation, etc.

Although the present invention has been described and illustrated with respect to a preferred embodiment and a preferred use therefor, it is not to be so limited since modifications and changes can be made therein which are within the full intended scope of the invention.

I claim:

1. A position measuring device for determining the position of a target surface, said device comprising:
    (a) light means for directing an initial light beam against the target surface and for causing a spot of diffuse reflected light to be projected from said target surface; said light means including a laser diode and including modulating means for modulating said laser diode to provide said light means with a large dynamic range to compensate for differences in target surface reflectivity and array temperature:
    (b) linear image sensor means mounted relative to said light means so that said reflected light will be directed thereagainst for producing a signal in response to the specific location said reflected light is focused upon said sensor means, the specific location said reflected light is focused upon said sensor means depending on the specific angle between said spot of reflected light and the plane of said linear image sensor means; and
    (c) analyzing means for receiving said signal from said sensor means and for producing output data concerning the position of said target surface, said analyzing means including peak detection means for determining the specific area of said sensor means that is most intensely illuminated and including peak amplitude compare circuit means for adjusting the output of said laser drive modulating means in response to the output of said sensor means.

2. The device of claim 1 in which said light means includes a laser diode and modulating means for modulating said laser diode to provide said light means with a large dynamic range to compensate for differences in target surface reflectivity and array temperature.

3. The device of claim 1 in which said analyzing means includes integrated linearization circuit means for linearizing said output data.

4. The device of claim 3 in which said linearization circuit means includes linearizing erasable programable read only memory circuits.

5. The device of claim 4 in which linear image sensor means includes a charge coupled device.

6. The device of claim 5 in which said charge coupled device has a planar face surface having a first end and a second end and arranged so that said reflected light will be focused adjacent said first end thereof when said target surface is located at one extreme position and will be focused adjacent said second end thereof when said target surface is located at the other extreme position.

7. The device of claim 6 in which said charge coupled device is positioned so that said reflected light is slightly out of focus.

8. The device of claim 1 in which said sensor means includes an image array having a plurality of photosites with said reflected light striking a plurality of said photosites and in which said peak detection means determines the specific photosite of said image array of said sensor means that is most intensely illuminated.

* * * * *